(12) United States Patent
Skelton

(10) Patent No.: US 12,012,045 B2
(45) Date of Patent: Jun. 18, 2024

(54) MOUNTABLE PORTABLE DEVICE RETAINER FOR A STEERING WHEEL

(71) Applicant: Todd Skelton, Litchfield Park, AZ (US)

(72) Inventor: Todd Skelton, Litchfield Park, AZ (US)

( * ) Notice: Subject to any disclaimer, the term of this patent is extended or adjusted under 35 U.S.C. 154(b) by 47 days.

(21) Appl. No.: 17/667,502

(22) Filed: Feb. 8, 2022

(65) Prior Publication Data

US 2022/0250554 A1    Aug. 11, 2022

Related U.S. Application Data

(60) Provisional application No. 63/146,989, filed on Feb. 8, 2021.

(51) Int. Cl.
*B60R 11/02* (2006.01)
*B60R 11/00* (2006.01)

(52) U.S. Cl.
CPC ..... *B60R 11/0241* (2013.01); *B60R 2011/001* (2013.01); *B60R 2011/0059* (2013.01); *B60R 2011/0063* (2013.01); *B60R 2011/0087* (2013.01)

(58) Field of Classification Search
CPC ............... B60R 2011/001; B60R 11/0241
USPC ................. 224/276, 560, 552, 929
See application file for complete search history.

(56) References Cited

U.S. PATENT DOCUMENTS

| | | | | |
|---|---|---|---|---|
| 3,598,295 A | * | 8/1971 | Seegers | B62J 11/00 224/450 |
| 3,920,211 A | * | 11/1975 | Knight | B60N 3/103 224/560 |
| 4,951,910 A | * | 8/1990 | March | B60N 3/106 248/205.2 |
| 5,542,314 A | * | 8/1996 | Sullivan | B60R 11/0252 224/276 |
| D431,019 S | | 9/2000 | Richter | |
| 6,760,569 B1 | | 7/2004 | Chen | |

(Continued)

FOREIGN PATENT DOCUMENTS

CA    2897687 A1 *   1/2017

OTHER PUBLICATIONS

Bayshop Car DashBoard Smartphone Holder Clip Car Phone Mount with 360 Degree Rotation, https://bayshop.com/ru_EN/ebay-us/buy-car-dashboard-smartphone-holder-clip-car-phone-mount-with360-degree-rotation-323105236163.

*Primary Examiner* — Justin M Larson

(57) ABSTRACT

A mountable portable device retainer for a steering wheel is an apparatus that secures a portable device, preferably a smart phone, against a steering wheel. The apparatus more specifically positions the portable device along a line of sight for a user while driving a vehicle. The apparatus includes a malleable bracing strip, a securing hook, and at least one portable device holder. The malleable bracing strip positions the at least one portable device holder across the steering wheel. The securing hook attaches the malleable bracing strip, and consequently the at least one portable device holder, with the corresponding portable device, with the steering wheel. The at least one portable device holder mounts the portable device with the steering wheel. The at least one portable device may press the portable device against the wheel of the steering wheel or mount the portable device beside the steering wheel.

16 Claims, 5 Drawing Sheets

(56) References Cited

U.S. PATENT DOCUMENTS

| | | | | |
|---|---|---|---|---|
| 7,216,789 B2* | 5/2007 | Caradimos | B60R 11/0252 | 224/276 |
| 7,456,777 B2* | 11/2008 | Piekarz | B60R 11/0264 | 361/679.09 |
| 7,503,573 B2* | 3/2009 | Finlaw | B62J 50/40 | 224/454 |
| 8,056,871 B2* | 11/2011 | Matias | F16M 11/10 | 248/176.1 |
| 8,496,144 B2* | 7/2013 | Son | B60R 11/02 | 224/276 |
| 8,505,792 B1 | 8/2013 | Jansen | | |
| 9,731,656 B1* | 8/2017 | States | B60R 11/00 | |
| 10,293,758 B2* | 5/2019 | Lowell | B60R 11/0241 | |
| 10,569,878 B2* | 2/2020 | Satterfield | B60N 2/79 | |
| 11,583,076 B2* | 2/2023 | Kinney | A47B 96/07 | |
| 2007/0029359 A1* | 2/2007 | Smith | B60R 11/02 | 224/276 |
| 2008/0029675 A1* | 2/2008 | Thorwaldson | B60R 11/00 | 248/339 |
| 2011/0240697 A1* | 10/2011 | Stephens | B60N 3/002 | 224/400 |
| 2016/0014243 A1* | 1/2016 | Snowden | H04M 1/04 | 455/575.1 |
| 2017/0029359 A1 | 2/2017 | Boulos | | |
| 2022/0250554 A1* | 8/2022 | Skelton | B60R 11/0241 | |

* cited by examiner

MOUNTABLE PORTABLE DEVICE RETAINER FOR A STEERING WHEEL

The current application claims a priority to the U.S. Provisional Patent application Ser. No. 63/146,989 filed on Feb. 8, 2021.

FIELD OF THE INVENTION

The present invention generally relates to portable device accessories. More specifically, the present invention is a mountable portable device retainer for a steering wheel.

BACKGROUND OF THE INVENTION

In present society, smart devices are starting to become a more integral part of daily life. People have a constant need to be on their smart devices for various purposes ranging from work and business to leisure and running errands. For instance, people are finding themselves relying more on their smart devices to guide them on roads to new or unfamiliar terrain or to alert them of traffic conditions or potential traffic jams. Although newer vehicles contain technology to allow users to easily link and utilize their smart devices through their car, older models and makes of vehicles do not carry this technology and functionality. Instead, most users will utilize car mounts for smart devices. There are a wide variety of these mounts depending on where the mount is attached, such as to the front windshield or the air vents. However, these mounts can contain some several setbacks. For instance, windshield mounts utilize suction cups, which can lose its effectiveness over time. Although there are smart device mounts that can be attached to the steering wheel, these devices can contain poor means of attachment that can be ineffective as the steering wheel is being turned around. Also, majority of these steering wheel mounts do not contain adjustability to accept various different types or kinds of smart devices.

It is therefore an objective of the present invention to provide users with a device that is a device mountable steering wheel clip. The present invention intends to provide users with a device that contains adjustability to allow various different kinds of smart devices to be secured to the steering wheel. The present invention intends to provide users with a device that can secure smart devices of various types and/or kinds to the steering wheel while the steering is in motion.

DETAILED DESCRIPTIONS OF THE INVENTION

Figure 1:
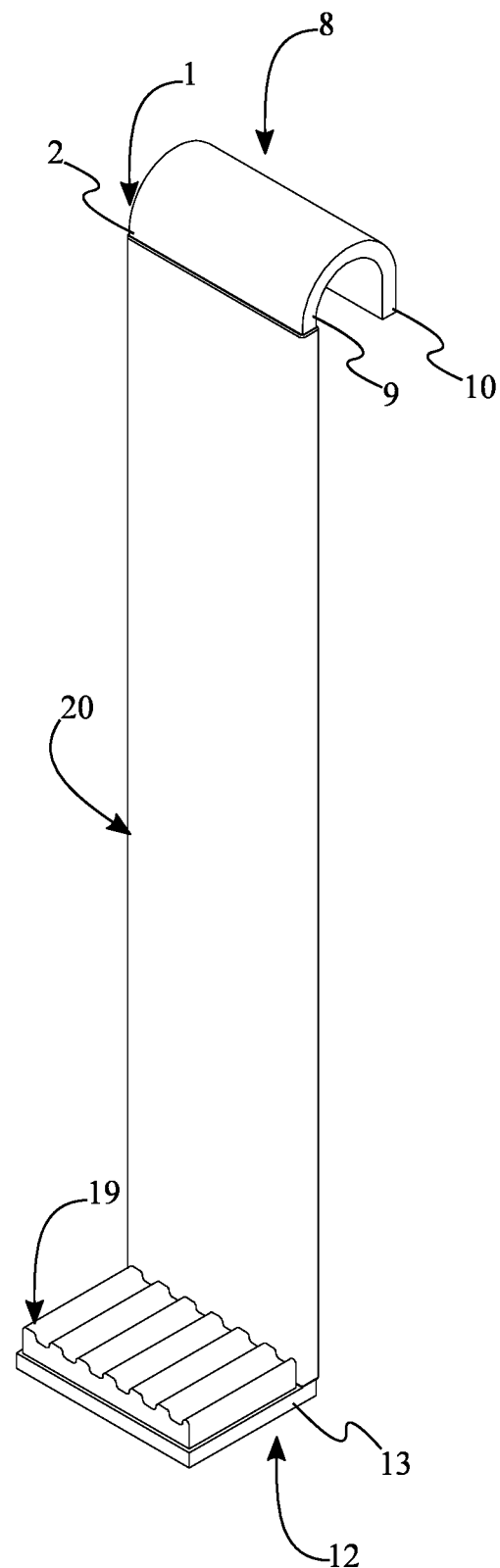
FIG. 1 is a front top perspective view of a preferred embodiment for a first embodiment of the present invention.

All illustrations of the drawings are for the purpose of describing selected versions of the present invention and are not intended to limit the scope of the present invention.

The present invention is a mountable portable device retainer for a steering wheel. The present invention serves as a universal retainer for a variety of portable devices. The preferred portable device that is engaged with the present invention is a smart phone. However, it is understood that various portable devices of comparable size and shape are compatible with the present invention. The present invention secures a portable device with a steering wheel such that a user maintains a constant line of vision towards the road in front of the vehicle while being able to safely view the screen of the portable device. In order to position a variety of portable devices along the line of sight of the user with any steering wheel, the present invention comprises a malleable bracing strip 1, a securing hook 8, and at least one portable device holder 12, seen in FIG. 1, FIG. 2, FIG. 3, FIG. 4, and FIG. 5. The malleable bracing strip 1 positions the at least one portable device holder 12 across the airbag module of the steering wheel. Moreover, the malleable bracing strip 1 contours to shape of the airbag module. The malleable bracing strip 1 comprises a fixed strip end 2, a free strip end 3, a first strip face 4, and a second strip face 5. The fixed strip end 2 remains connected to the airbag module with the securing hook 8, and the free strip end 3 is positioned along the airbag module. An overall length of the malleable bracing strip 1 is defined by the fixed strip end 2 and the free strip end 3. The first strip face 4 presses against the airbag module, and the second strip face 5 is oriented towards the user while driving the vehicle. The securing hook 8 attaches the malleable bracing strip 1 along an upper edge of the airbag module. The upper edge is oriented towards the wheel of the steering wheel. Moreover, the securing hook 8 wraps around the upper edge of the airbag module. The upper edge is positioned within the securing hook 8 as the securing hook 8 comprises a fixed hook end 9 and a free hook end 10. The fixed hook end 9 is positioned with the malleable bracing strip 1, and the free hook end 10 is offset with the fixed hook end 9. The variety of portable devices are mounted onto the malleable bracing strip 1 with the at least one portable device holder 12. The at least one portable device holder 12 may firmly grip a portable device against the wheel of the steering wheel or mount a portable device with the airbag module such that the portable device is free standing with the steering wheel.

The overall configuration of the aforementioned components effectively and quickly mounts a portable device against a steering wheel of a vehicle. In order for the malleable bracing strip 1 to traverse across the airbag module of a steering wheel, the fixed strip end 2 is positioned opposite the free strip end 3 along the malleable bracing strip 1, seen in FIG. 2, FIG. 3, FIG. 4, and FIG. 5 The malleable bracing strip 1 upholds the at least one portable device holder 12 as the first strip face 4 is positioned opposite the second strip face 5 about the malleable bracing strip 1. In order for the malleable bracing strip 1, and consequently the at least on portable device holder, to be suspended from the airbag module of the steering wheel, the fixed hook end 9 is fixed adjacent with the fixed strip end 2. The free hook end 10 is positioned offset from the fixed strip end 2 and is oriented away from the second strip face 5, thereby positioning the upper edge of the steering wheel into the securing hook 8. In order for the portable device to be oriented towards the user, the at least one portable device holder 12 is mounted onto the second strip face 5.

In a first embodiment of the present invention, the at least one portable device holder 12 comprises a lip 13, seen in FIG. 1. The lip 13 upholds a portable device with the malleable bracing strip 1 and serves as a stand for the portable device. Moreover, the lip 13 presses the portable device against the wheel of the steering wheel such that the portable device is firmly secured between the lip 13 and the wheel of steering wheel. In order to orient the portable device along the line of the sight of the user while attached with the present invention, the lip 13 is fixed perpendicular onto the second strip face 5, adjacent with the free strip end 3. This arrangement allows the portable device to rest on the lip 13. Furthermore, as the malleable bracing strip 1 may be slightly deformed, the lip 13 presses the portable device against the wheel. The first embodiment of the present invention preferably further comprises a piece of friction-inducing pad 19. The piece of friction-inducing pad 19 reinforces the position of the portable device across the lip 13 and limits the movement of the portable device from side to side. The piece of friction-inducing pad 19 is preferably made of rubber and may further comprise a plurality of grooves to increase the friction between the portable device and the lip 13. The portable device comes into direct contact with the piece of friction-inducing pad 19 as the piece of friction-inducing pad 19 is positioned adjacent with the lip 13 and is oriented towards the second strip face 5. The portable device is balanced across the lip 13 as the piece of friction-inducing pad 19 is fixed across the lip 13.

In order to preserve the structural integrity of the airbag module and the portable device from any sharp edge of the malleable strip, the first embodiment of the present invention preferably further comprises a cover sleeve 20, also seen in FIG. 1. The cover sleeve 20 is preferably made of fabric. The cover sleeve 20 is laterally positioned around the malleable bracing strip 1, shielding the airbag module and the portable device from direct contact with the malleable bracing strip 1. The securing hook 8 remains uninhibited by the cover sleeve 20 as the cover sleeve 20 traverses from the fixed end to the free end.

Figure 2:
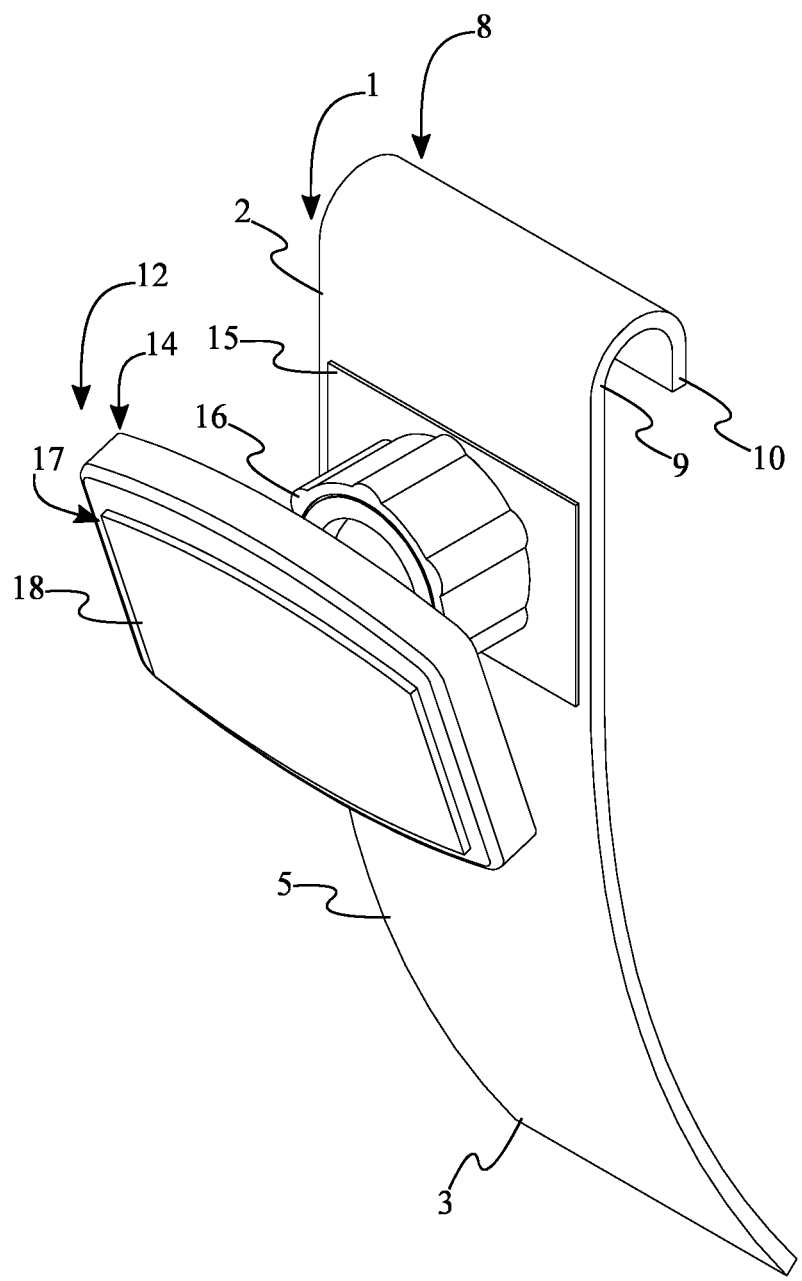
FIG. 2 is a front top perspective view of a preferred embodiment for a second embodiment of the present invention.
Figure 3:
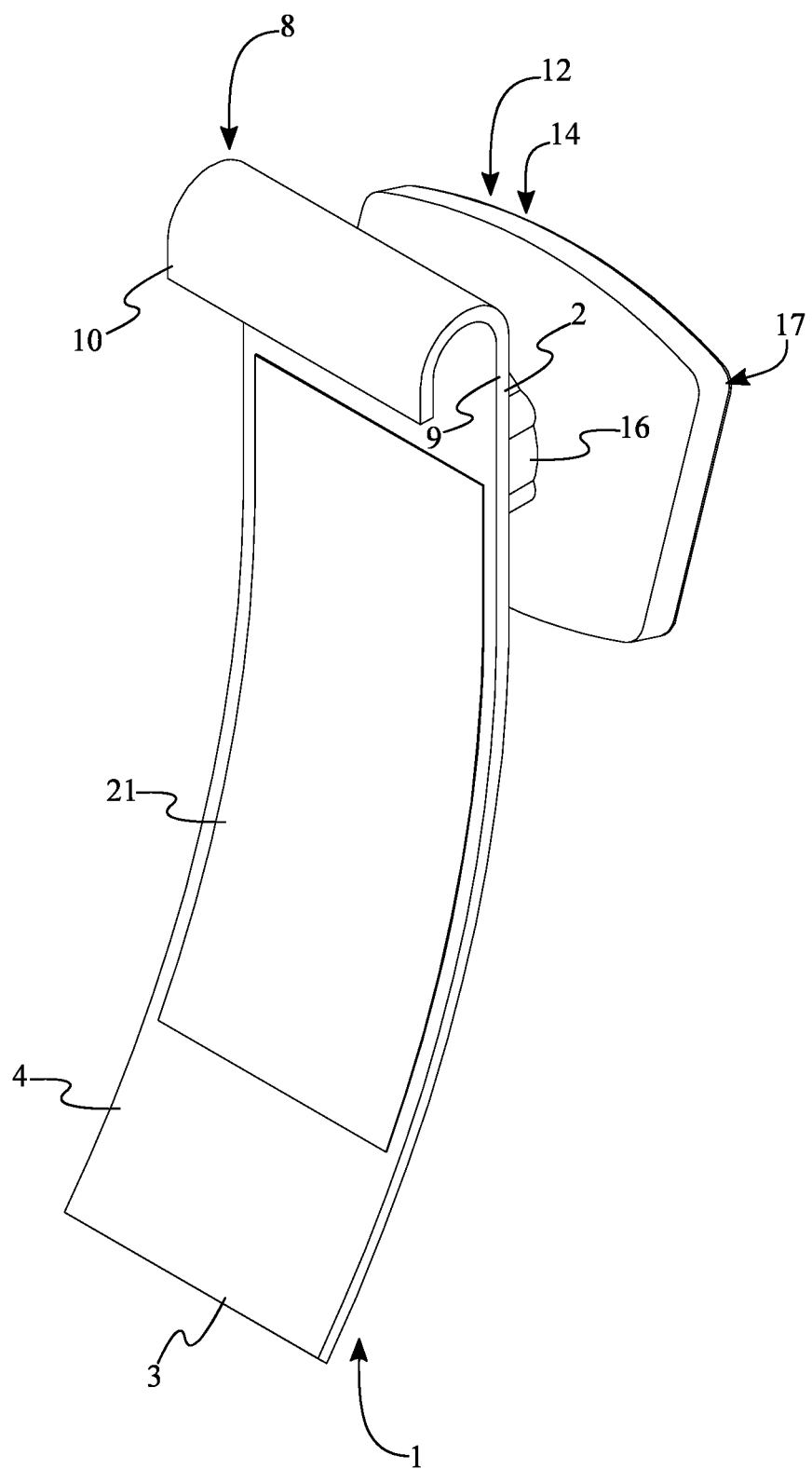
FIG. 3 is a rear top perspective view of an alternate embodiment for the second embodiment of the present invention with an adhesive layer.

In a second embodiment of the present invention, the at least one portable device holder 12 comprises a ball-and-socket mount 14, seen in FIG. 2 and FIG. 3. The ball-and-socket mount 14 connects the portable device with the malleable bracing strip 1, and consequently the steering wheel, while providing a free range of motion for the portable device to be oriented and positioned as desired. In order for the ball-and-socket mount 14 to connect the portable device with the malleable bracing strip 1, the ball-and-socket mount 14 comprises a base plate 15, a ball-and-socket joint 16, and a device attachment mechanism 17. The base plate 15 attaches the ball-and-socket joint 16 with the malleable bracing strip 1. The ball-and-socket joint 16 pivots and tilts the device attachment mechanism 17. The device attachment mechanism 17 connects the portable device with the ball-and-socket joint 16. The device attachment mechanism 17 may include a variety of fasteners that secures the portable device with the ball-and-socket joint 16 such that the portable device is readily connected and disconnected with the ball-and-socket mount 14. The portable device remains positioned within the line of sight of the user regardless of the angle of tilt of the device attachment mechanism 17 as the base plate 15 is positioned offset from the securing hook 8. The base plate 15 is fixed onto the second strip face 5 so that the portable device remains oriented towards the user. More specifically, the device attachment mechanism 17 is positioned adjacent to the base plate 15, opposite the malleable bracing strip 1. In order for the device attachment mechanism 17 to have a free range of motion and the portable device may be tilted as desired, the device attachment mechanism 17 is pivotally connected to the base plate 15 by the ball-and-socket joint 16. The portable device is readily connected and disconnected onto the ball-and-socket joint 16 and the screen of the portable device remains uninhibited as a device interface 18 of the device attachment mechanism 17 is oriented away from the ball-and-socket joint 16. The device interface 18 is preferably at least one fastener, such as a magnet or a clamp, that connects a portable device with the device attachment mechanism 17.

Alternatively, the first embodiment and the second embodiment of the present invention may further comprise an adhesive layer 21, seen in FIG. 3. The adhesive layer 21 reinforces the position of the malleable bracing strip 1 along the airbag module of a steering wheel. In order for the piece of adhesive to come into contact with the airbag module, the adhesive layer 21 is positioned adjacent with the first strip face 4 and is fixed across the first strip face 4.

Figure 4:
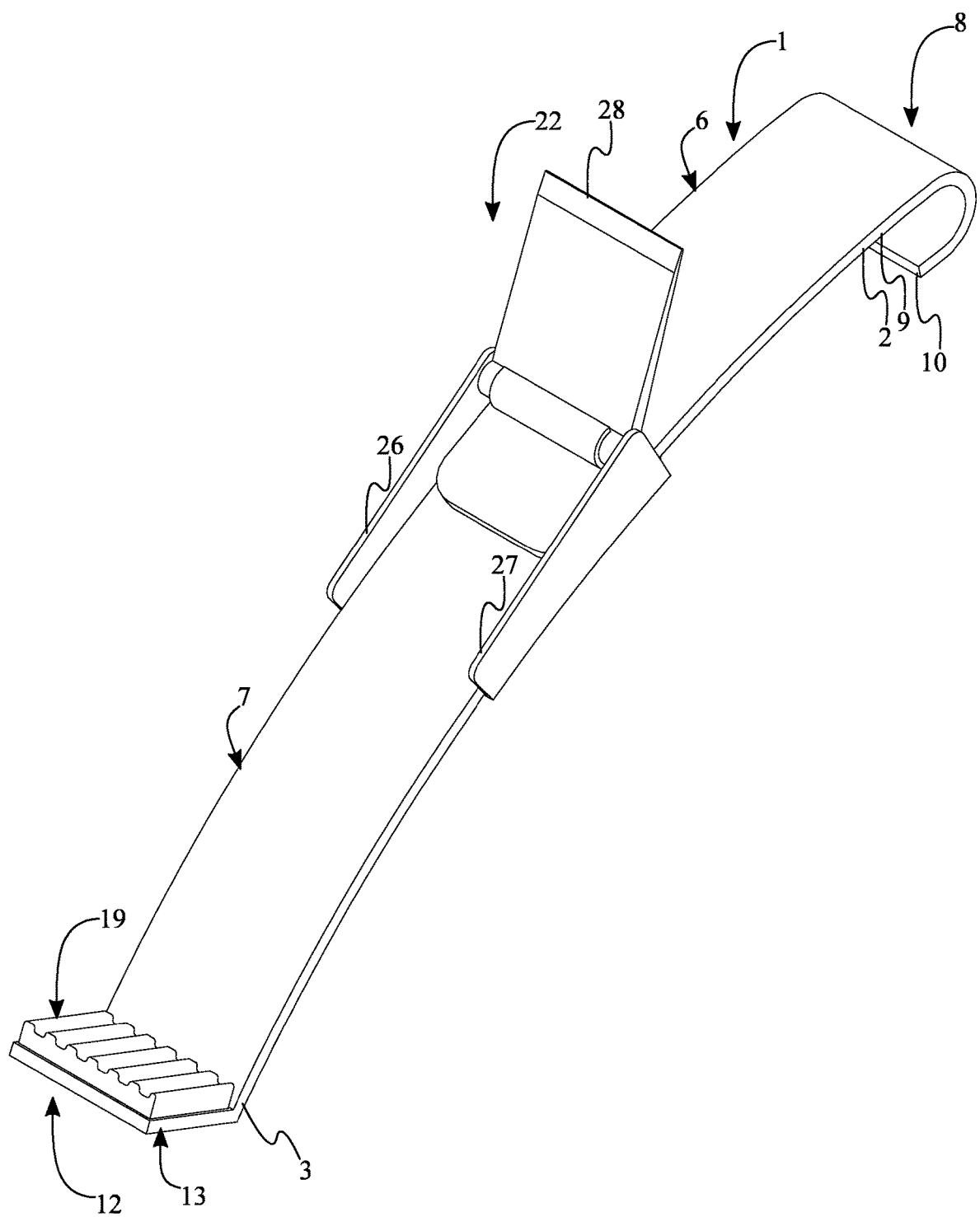
FIG. 4 is a front top perspective view of a preferred embodiment for a third embodiment of the present invention.
Figure 5:
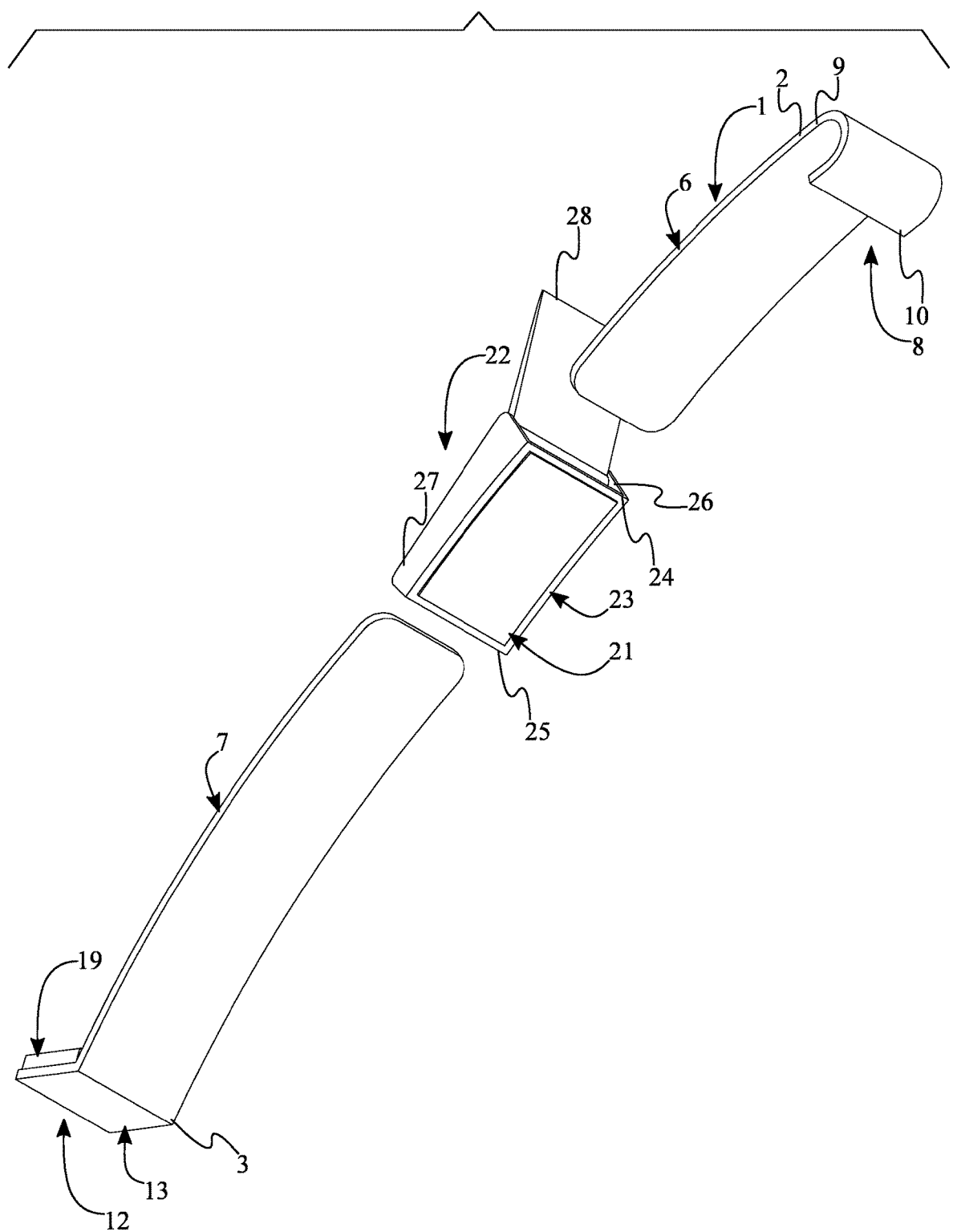
FIG. 5 is a rear bottom perspective view of an alternate embodiment for the third embodiment of the present invention with an adhesive layer.

A third embodiment of the present invention further comprises a latch mechanism 22, and the malleable bracing strip 1 further comprises a fixed elongated plate 6 and a free elongated plate 7, seen in FIG. 4 and FIG. 5. In this third embodiment, the overall length of the malleable bracing strip 1 is adjustable to further accommodate various portable devices. The latch mechanism 22 connects the fixed elongated plate 6 with the free elongated plate 7. The fixed elongated plate 6 remains attached with the airbag module, and the free elongated plate 7 slides along the fixed elongated plate 6. The fixed elongated plate 6 is positioned adjacent with the free elongated plate 7. The structural integrity of the malleable bracing strip 1 is preserved while overall length is adjusted as the fixed elongated plate 6 is positioned colinear with the free elongated plate 7. In order for the malleable bracing strip 1 to remain stationary across the airbag module as the overall length is adjustable, the fixed strip end 2 is terminally positioned with the fixed elongated plate 6, opposite the free elongated plate 7. Moreover, the free strip end 3 is terminally positioned with the free elongated plate 7, opposite the fixed elongated plate 6. In order for the portable device to be safely secured with the malleable bracing strip 1 and positioned as desired by the user across the airbag module, the free elongated plate 7 is operatively coupled with the fixed elongated plate 6 by the latch mechanism 22, wherein the latch mechanism 22 is used to lock the free elongated plate 7 along the fixed elongated plate 6 and is used to unlock the free elongated plate 7 along the fixed elongated plate 6.

In order for the free elongated plate 7 to be slide long the fixed elongated plate 6, the latch mechanism 22 comprises a base plate 23, a first lateral wall 26, a second lateral wall 27, and a press latch 28, also seen in FIG. 4 and FIG. 5. The base plate 23 upholds and positions the fixed elongated plate 6 and the free elongated plate 7 with each other. The base plate 23 comprises a first edge 24 and a second edge 25. The first edge 24 is positioned opposite the second edge 25 across the base plate 23. The first edge 24 and the second edge 25 traverse across the width of the malleable bracing strip 1. More specifically, the first lateral wall 26 is fixed adjacent to the base plate 23. The first lateral wall 26 and the second lateral wall 27 serve as barriers for the fixed elongated plate 6 and the free elongated plate 7. Moreover, the first lateral wall 26 and the second lateral wall 27 define a track for the fixed elongated plate 6 and the free elongated plate 7 with the base wall. The press latch 28 secures the free elongated plate 7 along the fixed elongated plate 6. Furthermore, the press latch 28 allows a user to manually lock and unlock the free elongated plate 7 with the fixed elongated plate 6. The track for the fixed elongated plate 6 and the free elongated plate 7 through the latch mechanism 22 is defined as the second lateral wall 27 is fixed adjacent to the base plate 23, opposite to the first lateral wall 26. The first lateral wall 26 and the second lateral wall 27 are positioned perpendicular to the base plate 23, securing the colinear arrangement between the fixed elongated plate 6 and the free elongated plate 7. The first lateral wall 26 and the second lateral wall 27 are positioned in between the first edge 24 and the second edge 25, thereby accommodating the width of the malleable bracing strip 1. More specifically, the first edge 24 is oriented towards the fixed strip end 2, and the second edge 25 is oriented towards the free strip end 3. In order for the fixed elongated plate 6 and the free elongated plate 7 to be positioned in between the base plate 23 and the latch press, the press latch 28 is positioned offset from the base plate 23. The press latch 28 is positioned adjacent with the first edge 24 so that the at least one portable device holder 12 may come into full contact with the portable device without being inhibited by the press latch 28. In the third embodiment of the present invention, the at least one portable device holder 12 comprises a lip 13 similar to that of the first embodiment of the present invention. In order to lock and release the fixed elongated plate 6 with the free elongated plate 7, the press latch 28 is rotatably mounted with the first lateral wall 26 and the second lateral wall 27. The fixed elongated plate 6 and the free elongated plate 7 are slidably engaged along each other in between the first lateral wall 26 and the second lateral wall 27, thereby allowing the overall length of the malleable bracing strip 1 to be adjustable. More specifically, the overall length of the malleable bracing strip 1 is fixed when the latch mechanism 22 and the malleable bracing strip 1 are in a locked configuration. While in the locked configuration, the fixed elongated plate 6 and the free elongated plate 7 are positioned in between the press latch 28 and the base plate 23.

The third embodiment of present invention may alternatively further comprise an adhesive layer 21, seen in FIG. 5, similar to that of the alternate embodiments of the first embodiment of the present invention and the second embodiment of the present invention. The adhesive layer 21 reinforces the position of the latch mechanism 22 on the airbag module of a steering wheel. In order for the piece of adhesive to come into contact with the airbag module, the adhesive layer 21 is fixed adjacent to the base plate 23, opposite to the malleable bracing strip 1, as the malleable bracing strip 1 is supported by the latch mechanism 22, specifically the base plate 23.

Although the invention has been explained in relation to its preferred embodiment, it is to be understood that many other possible modifications and variations can be made without departing from the spirit and scope of the invention as hereinafter claimed.

What is claimed is:

1. A mountable portable device retainer for a steering wheel comprising:
   a malleable bracing strip;
   a securing hook;
   at least one portable device holder;
   a latch mechanism;
   the malleable bracing strip comprising a fixed strip end, a free strip end, a first strip face, a second strip face, a fixed elongated plate, and a free elongated plate;
   the securing hook comprising a fixed hook end and a free hook end;
   the fixed strip end being positioned opposite the free strip end along the malleable bracing strip;
   the first strip face being positioned opposite the second strip face about the malleable bracing strip;
   the fixed hook end being fixed adjacent with the fixed strip end;
   the free hook end being positioned offset from the fixed strip end;
   the free hook end being oriented away from the second strip face;
   the at least one portable device holder being mounted onto the second strip face;
   the fixed elongated plate being positioned adjacent with the free elongated plate;
   the fixed elongated plate being positioned colinear with the free elongated plate;
   the fixed strip end being terminally positioned with the fixed elongated plate, opposite the free elongated plate;
   the free strip end being terminally positioned with the free elongated plate, opposite the fixed elongated plate; and
   the free elongated plate being operatively coupled with the fixed elongated plate by the latch mechanism, wherein the latch mechanism is used to lock the free elongated plate along the fixed elongated plate and is used to unlock the free elongated plate along the fixed elongated plate.

2. The mountable portable device retainer for a steering wheel as claimed in claim 1 comprising:
   the at least one portable device holder comprising a lip; and
   the lip being fixed perpendicular onto the second strip face, adjacent with the free strip end.

3. The mountable portable device retainer for a steering wheel as claimed in claim 2 comprising:
   a friction-inducing pad;
   the friction-inducing pad being positioned adjacent with the lip;
   the friction-inducing pad being oriented towards the second strip face; and
   the friction-inducing pad being fixed across the lip.

4. The mountable portable device retainer for a steering wheel as claimed in claim 1 comprising:
   a cover sleeve;
   the cover sleeve being laterally positioned around the malleable bracing strip; and
   the cover sleeve traversing from the fixed end to the free end.

5. The mountable portable device retainer for a steering wheel as claimed in claim 1 comprising:
   the at least one portable device holder comprising a ball-and-socket mount;
   the ball-and-socket mount comprising a base plate, a ball-and-socket joint, and a device attachment mechanism;
   the base plate being positioned offset from the securing hook;
   the base plate being fixed onto the second strip face;
   the device attachment mechanism being positioned adjacent to the base plate, opposite the malleable bracing strip;
   the device attachment mechanism being pivotally connected to the base plate by the ball-and-socket joint; and
   a device interface of the device attachment mechanism being oriented away from the ball-and-socket joint.

6. The mountable portable device retainer for a steering wheel as claimed in claim 1 comprising:
an adhesive layer;
the adhesive layer being positioned adjacent with the first strip face; and
the adhesive layer being fixed across the first strip face.

7. The mountable portable device retainer for a steering wheel as claimed in claim 1 comprising:
the latch mechanism comprises a base plate, a first lateral wall, a second lateral wall, and a press latch;
the base plate comprising a first edge and a second edge;
the first edge being positioned opposite the second edge across the base plate;
the first lateral wall being fixed adjacent to the base plate;
the second lateral wall being fixed adjacent to the base plate, opposite to the first lateral wall;
the first lateral wall and the second lateral wall being positioned perpendicular to the base plate;
the first lateral wall and the second lateral wall being positioned in between the first edge and the second edge;
the first edge being oriented towards the fixed strip end;
the second edge being oriented towards the free strip end;
the press latch being positioned offset from the base plate;
the press latch being positioned adjacent with the first edge;
the press latch being rotatably mounted with the first lateral wall and the second lateral wall; and
the fixed elongated plate and the free elongated plate being slidably engaged along each other in between the first lateral wall and the second lateral wall.

8. The mountable portable device retainer for a steering wheel as claimed in claim 7 comprising:
wherein the latch mechanism and the malleable bracing strip are in a locked configuration; and
the fixed elongated plate and the free elongated plate being positioned in between the press latch and the base plate.

9. The mountable portable device retainer for a steering wheel as claimed in claim 7 comprising:
an adhesive layer; and
the adhesive layer being fixed adjacent to the base plate, opposite to the malleable bracing strip.

10. A mountable portable device retainer for a steering wheel comprising:
a malleable bracing strip;
a securing hook;
at least one portable device holder;
a latch mechanism;
the malleable bracing strip comprising a fixed strip end, a free strip end, a first strip face, a second strip face, a fixed elongated plate, and a free elongated plate;
the securing hook comprising a fixed hook end and a free hook end;
the at least one portable device holder comprising a lip;
the fixed strip end being positioned opposite the free strip end along the malleable bracing strip;
the first strip face being positioned opposite the second strip face about the malleable bracing strip;
the fixed hook end being fixed adjacent with the fixed strip end;
the free hook end being positioned offset from the fixed strip end;
the free hook end being oriented away from the second strip face;
the at least one portable device holder being mounted onto the second strip face; and
the lip being fixed perpendicular onto the second strip face, adjacent with the free strip end,
the fixed elongated plate being positioned adjacent with the free elongated plate;
the fixed elongated plate being positioned colinear with the free elongated plate;
the fixed strip end being terminally positioned with the fixed elongated plate, opposite the free elongated plate;
the free strip end being terminally positioned with the free elongated plate, opposite the fixed elongated plate; and
the free elongated plate being operatively coupled with the fixed elongated plate by the latch mechanism, wherein the latch mechanism is used to lock the free elongated plate along the fixed elongated plate and is used to unlock the free elongated plate along the fixed elongated plate.

11. The mountable portable device retainer for a steering wheel as claimed in claim 10 comprising:
a piece of friction-inducing pad;
the piece of friction-inducing pad being positioned adjacent with the lip;
the piece of friction-inducing pad being oriented towards the second strip face; and
the piece of friction-inducing pad being fixed across the lip.

12. The mountable portable device retainer for a steering wheel as claimed in claim 10 comprising:
a cover sleeve;
the cover sleeve being laterally positioned around the malleable bracing strip; and
the cover sleeve traversing from the fixed end to the free end.

13. The mountable portable device retainer for a steering wheel as claimed in claim 10 comprising:
an adhesive layer;
the adhesive layer being positioned adjacent with the first strip face; and
the adhesive layer being fixed across the first strip face.

14. The mountable portable device retainer for a steering wheel as claimed in claim 10 comprising:
the latch mechanism comprises a base plate, a first lateral wall, a second lateral wall, and a press latch;
the base plate comprising a first edge and a second edge;
the first edge being positioned opposite the second edge across the base plate;
the first lateral wall being fixed adjacent to the base plate;
the second lateral wall being fixed adjacent to the base plate, opposite to the first lateral wall;
the first lateral wall and the second lateral wall being positioned perpendicular to the base plate;
the first lateral wall and the second lateral wall being positioned in between the first edge and the second edge;
the first edge being oriented towards the fixed strip end;
the second edge being oriented towards the free strip end;
the press latch being positioned offset from the base plate;
the press latch being positioned adjacent with the first edge;
the press latch being rotatably mounted with the first lateral wall and the second lateral wall; and
the fixed elongated plate and the free elongated plate being slidably engaged along each other in between the first lateral wall and the second lateral wall.

15. The mountable portable device retainer for a steering wheel as claimed in claim 14 comprising:
wherein the latch mechanism and the malleable bracing strip are in a locked configuration; and the fixed elongated plate and the free elongated plate being positioned in between the press latch and the base plate.

16. The mountable portable device retainer for a steering wheel as claimed in claim 14 comprising:
an adhesive layer; and
the adhesive layer being fixed adjacent to the base plate, opposite to the malleable bracing strip.

\* \* \* \* \*